United States Patent
Kurimoto et al.

(10) Patent No.: US 6,712,326 B2
(45) Date of Patent: Mar. 30, 2004

(54) ROTARY STAND FOR AN ELECTRIC APPLIANCE

(75) Inventors: Masahiko Kurimoto, Singapore (SG); Loo Lian Cheang, Singapore (SG); Tang Han Zhong, Singapore (SG); Lee Deng Siong, Singapore (SG)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/231,940

(22) Filed: Aug. 30, 2002

(65) Prior Publication Data

US 2003/0062461 A1 Apr. 3, 2003

(30) Foreign Application Priority Data

Aug. 31, 2001 (JP) ......................................... 2001-263461

(51) Int. Cl.⁷ ............................................... A47B 91/00
(52) U.S. Cl. ...................... 248/349.1; 248/371; 248/919
(58) Field of Search ............................. 248/349.1, 371, 248/917–923, 181.2, 292.13, 372.1

(56) References Cited

U.S. PATENT DOCUMENTS

| | | | | |
|---|---|---|---|---|
| 4,068,961 A | * | 1/1978 | Ebner et al. ................... 403/55 |
| 4,542,872 A | * | 9/1985 | Marino et al. ............ 248/183.3 |
| 4,738,422 A | | 4/1988 | Mataheson et al. | |
| 4,880,191 A | * | 11/1989 | Lake, Jr. ...................... 248/371 |
| 5,195,707 A | | 3/1993 | Ignatuk et al. | |
| 5,209,446 A | * | 5/1993 | Kawai ..................... 248/183.2 |
| 5,398,903 A | * | 3/1995 | Cho ......................... 248/349.1 |
| 5,465,936 A | * | 11/1995 | Wang .......................... 248/371 |
| 5,603,478 A | * | 2/1997 | Wang .......................... 248/371 |
| 5,632,463 A | * | 5/1997 | Sung et al. ................... 248/371 |
| 5,687,944 A | * | 11/1997 | Shon ........................ 248/349.1 |
| 5,971,268 A | * | 10/1999 | Lynch et al. ................. 235/1 R |
| 6,047,939 A | * | 4/2000 | Kim ........................... 248/371 |
| 6,275,375 B1 | | 8/2001 | Nam | |

FOREIGN PATENT DOCUMENTS

| | | |
|---|---|---|
| GB | 2 320 387 A | 6/1998 |
| JP | 10-238693 | 9/1998 |
| JP | 10-301665 | 11/1998 |

OTHER PUBLICATIONS

Australian Patent Office Search Report for corresponding application SG 200205279–3, issued Mar. 5, 2003.

* cited by examiner

*Primary Examiner*—Leslie A. Braun
*Assistant Examiner*—Tan Le
(74) *Attorney, Agent, or Firm*—RatnerPrestia

(57) ABSTRACT

A rotary stand for an electric appliance enables the electric appliance to be oriented in a desired direction. The rotary stand includes a pedestal having a spherically concave portion and a regulating projection, a mounting plate adapted to support the appliance, and a clamp plate for clamping the mounting plate between the clamp plate and the pedestal so that the mounting plate can be swung either leftwards or rightwards and/or tilted up or down. The angle of any one of swing and tilt of the mounting plate is regulated by causing side edges of the regulating projection to engage corresponding inner side edges of a slot defined in the mounting plate.

7 Claims, 6 Drawing Sheets

ROTARY STAND FOR AN ELECTRIC APPLIANCE

BACKGROUND OF THE INVENTION

1. Field of the Invention

The present invention generally relates to a support assembly for supporting thereon an electric appliance such as, for example, a computer display unit or an audio equipment and, in particular but not exclusively, to a rotary stand for the electric appliance that is effective to improve functionality of the electric appliance by allowing the latter to be adjustable in orientation depending on the site in which the electric appliance is placed.

2. Description of the Related Art

The conventional rotary stand is known to include a pedestal formed with a spherically concave portion, and an electric appliance such as, for example, a computer display unit or an audio equipment is mounted thereon through a mounting plate having a concave portion complementary in shape to the shape of the spherically concave portion. The pedestal has a center portion formed integrally with a hollow cylindrical boss that is loosely inserted through an elongated opening defined in a center portion of a mounting plate on which the electric appliance is mounted, with a clamp plate biased by a screwed spring element towards the mounting plate so that the electric appliance on the mounting plate can be tilted up and down and/or swung leftwards and rightwards.

However, with the conventional rotary stand of the structure discussed above, when the electric appliance mounted on the mounting plate of the rotary stand is tilted or swung, the clamp plate then biased by the spring element rotate together with the mounting plate. Accordingly, the cylindrical boss integral with the pedestal, which extends through a center hole in the clamp plate to hold the clamp plate, has one end face susceptible to frictional wear, or obnoxious sounds tend to be generated between the spring element and the screw, resulting in the possibility that the spring comes to rotate with increase in frequency of use to eventually loosen the screw.

The screw engaged in the cylindrical boss integral with the pedestal is normally biased by the spring element in a direction counter to the direction in which the screw is fastened into the cylindrical boss. Accordingly, repeated tilt and/or swing of the rotary stand or the use thereof in an environment rich of oil would result in cracking in the cylindrical boss or, if not at all, a detrimental fracture of the cylindrical boss.

SUMMARY OF THE INVENTION

The present invention has been developed to overcome the above-described disadvantages.

It is accordingly an objective of the present invention to provide a highly reliable, robust and simplified rotary stand wherein the functionality thereof is increased by allowing the display unit or the audio equipment to be oriented in any direction as desired, and wherein both the possibility of the obnoxious sounds generated between the spring used to bias the clamp plate and the screw and the possible loosening of the screw used to press the spring which would otherwise take place as the frequency of use increases are substantially eliminated to thereby avoid any possible cracking in or fracture of the boss integral with the pedestal.

In accomplishing the above and other objectives, the present invention provides a rotary stand for the support thereon of a display unit or an audio equipment, which includes a pedestal having a spherically concave portion and a regulating projection formed in the spherically concave portion, a mounting plate having a bearing portion of a shape corresponding to the spherically concave portion and adapted to support thereon the display unit or the audio equipment, and a clamp plate having a shape similar to the bearing portion of the mounting plate for clamping the mounting plate between it and the pedestal while allowing the mounting plate to undergo a swinging motion leftwardly and rightwardly and also a tilting motion up and down. The bearing portion of the mounting plate has a slot defined therein, and the angle of any one of swing and tilt of the mounting plate is regulated by causing side edges of the regulating projection to engage corresponding inner side edges of the slot.

According to the present invention, in view of the fact that the display unit or the audio equipment can be oriented in any desired direction within a predetermined angle of tilt and/or within a predetermined angle of swing, the functionality of the device can advantageously be increased.

In one preferred embodiment, the slot referred to above has a pair of parallel long side edges and, when the side edges of the regulating projection are brought into engagement with the long side edges of the slot, the angle of swing in a leftward or rightward direction is limited, whereas when the side edges of the regulating projection are brought into engagement with inner edges of the slot other than the long side edges, the angle of tilt in an upward or downward direction is limited. This arrangement enables the functionality of the device to be increased with a simplified construction.

Preferably, the regulating projection has approximately right-angled corners one on each end of a major axis thereof and also has side edges one on each end of a minor axis thereof. In this case, each of the side edges is curved to represent a generally arcuated shape, and the regulating projection has a width as measured in a direction along the minor axis thereof that is approximately equal to a width of the slot as defined between the long side edges of the slot. This arrangement also enables the functionality of the device to be increased with a simplified construction.

In another preferred embodiment of the present invention, the spherically concave portion of the pedestal is formed with a rectangular projection and the clamp plate is formed with a generally rectangular opening defined therein. Opposite edge portions of the clamp plate that define opposite sides of the opening are bent downwardly to engage the rectangular projection to thereby allow the clamp plate to be retained relative to the pedestal. According to this embodiment, no members other than the mounting plate rotate even when the device is tilted and/or swung and, therefore, the highly reliable and robust rotary stand can be obtained in which the possibility is eliminated in which cracking or fracture may occur in the boss integral with the pedestal that is formed integrally with the regulating projection and the rectangular projection.

In a further preferred embodiment of the present invention, a spring having a lower end fixed to the pedestal may be provided for biasing the clamp plate towards the bearing portion of the mounting plate. This spring does not rotate relative to the pedestal and, therefore, there is no possibility of obnoxious sounds being otherwise generated between the spring and the screw. Also, even if the frequency of use of the rotary stand increases, there is no possibility of the spring being loosened.

The regulating projection and the rectangular projection may preferably have a common hole defined therein for passage of a screw therethrough with a free end thereof fastened by a nut to thereby connect the mounting plate, the clamp plate and the spring together with the pedestal. This arrangement is effective to avoid the possibility of cracking or fracture taking place in the boss even when the rotary stand is repeatedly swung and/or tilted and is used in an environment rich of oil.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENT

This application is based on an application No. 2001-263461 filed Aug. 31, 2001 in Japan, the content of which is herein expressly incorporated by reference in its entirety.

Figure 1:
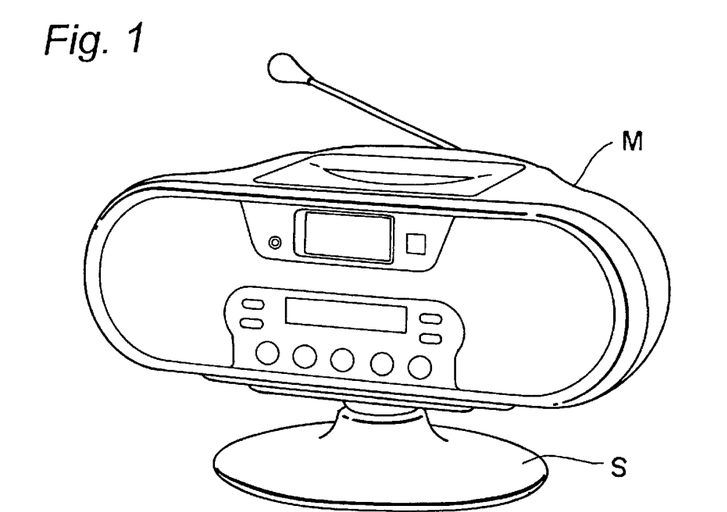
FIG. 1 is a perspective view of a personal MD system mounted on a rotary stand according to the present invention.
Figure 2A:
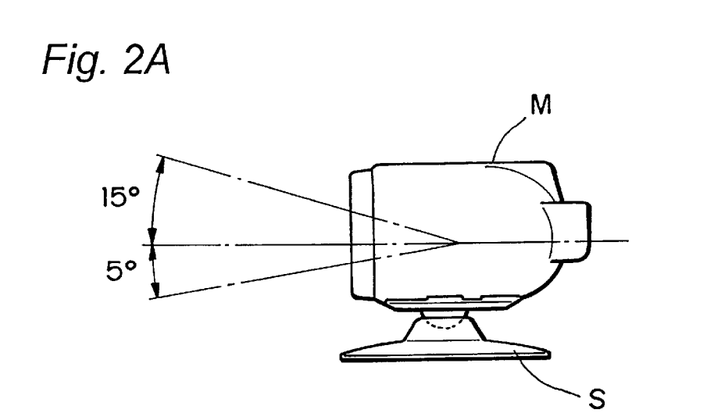
FIG. 2A is a side view of the personal MD system, showing the range of tilt of such system relative to the rotary stand.
Figure 2B:
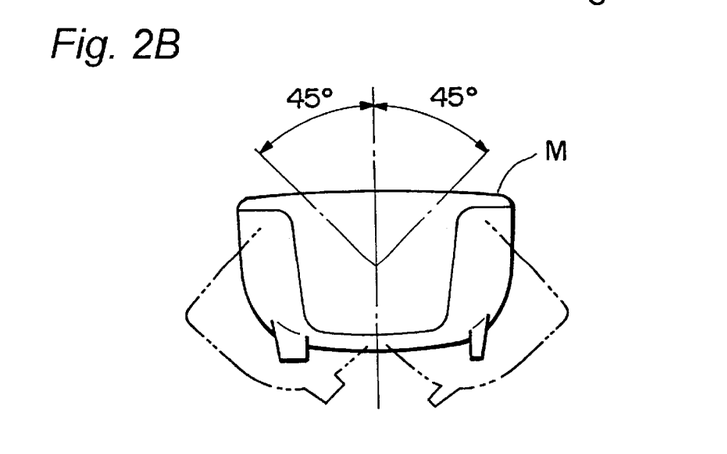
FIG. 2B is a top plan view of the personal MD system, showing the range of swing of such system relative to the rotary stand.

Referring to FIG. 1, there is shown a personal MD system M mounted on a rotary stand S according to one embodiment of the present invention. The illustrated rotary stand S is used to support thereon the personal MD system M for tilting up and down through a predetermined tilt angle, say, 15° upwardly and 5° downwardly as shown in FIG. 2A and also for swinging left and right as shown in FIG. 2B through a predetermined swing angle, say, 45° either leftwards or rightwards with respect to a neutral position as will be discussed later.

Figure 3:
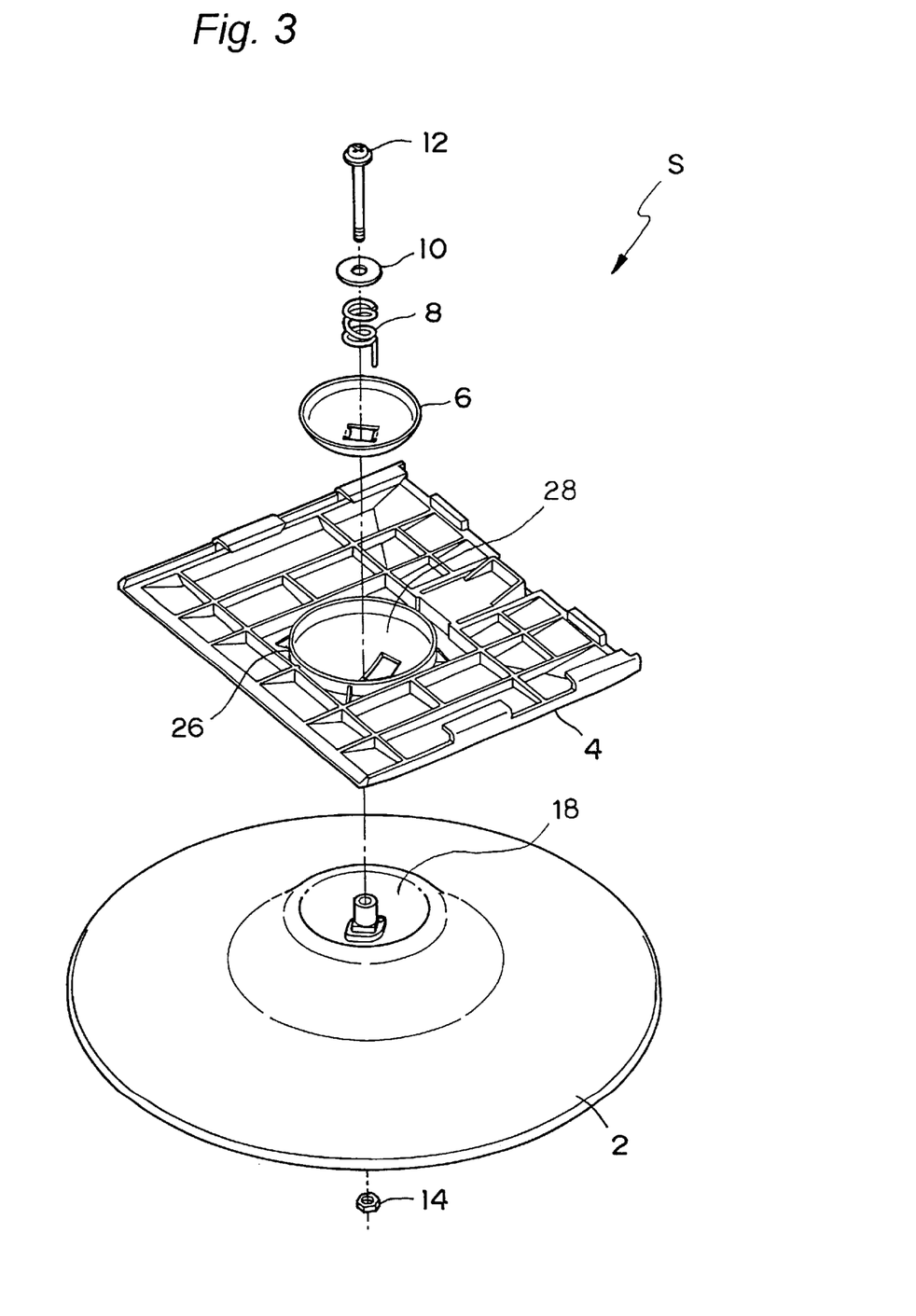
FIG. 3 is an exploded perspective view of the rotary stand according to the present invention.

As best shown in FIG. 3, the rotary stand S includes a pedestal 2 that is of a generally round shape so far shown, a mounting plate 4 that is of a generally rectangular shape so far shown, a clamp plate 6 disposed above the mounting plate 4 and adapted to movably clamp the mounting plate 4 in cooperation with the pedestal 2, a screw 12 and a nut 14 for connecting the mounting plate 4, the clamp plate 6 and the pedestal 2 together with a coiled spring 8 and a washer 10 interposed between a head of the screw 12 and the clamp plate 6. The pedestal 2 and the mounting plate 4 are preferably made of a plastic material whereas the clamp plate 6 is preferably made of either a plastic material or a metallic material.

Figure 4:
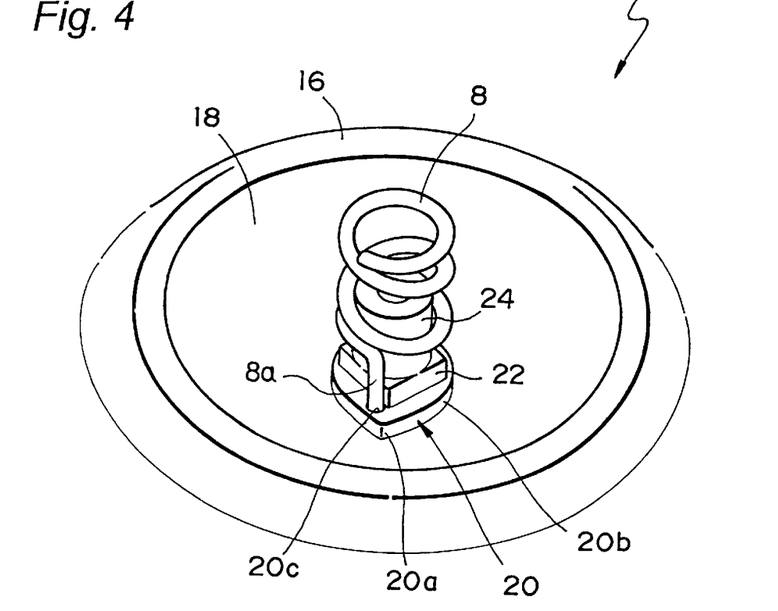
FIG. 4 is a perspective view showing a portion of a pedestal of the rotary stand shown in FIG. 3.

Referring to FIG. 4, the pedestal 2 has a geometrical center defined therein and spaced an equal distance radially inwardly from the perimeter of the pedestal 2 and is formed with a round rim 16 concentric with the geometrical center thereof. A center portion of the pedestal 2 inside the round rim 16 is downwardly, as viewed in FIG. 3, depressed to define a spherically concave portion 18 in alignment with the geometric center of the pedestal 2. A regulating projection 20 is formed integrally with the pedestal 2 so as to occupy a position at the bottom of the spherically concave portion 18 in alignment with the geometric center of the pedestal 2. Mounted atop the regulating projection 20 is a substantially rectangular projection 22 formed integrally with the regulating projection 20, the function of which will be described later. A hollow cylindrical projection 24 is in turn formed integrally with the rectangular projection 22 so as to protrude upwardly therefrom in alignment with the geometric center of the pedestal 2.

It is to be noted that the regulating projection 20 is of a generally rhombic shape defined by equally partially removing opposite two of the four right-angled corners of the square shape to define respective rounded side edge while the remaining two opposite corners are left right-angled. Thus, the regulating projection 20 of the particular shape discussed above has a geometric major axis, representing the length of the regulating projection 20, and a geometric minor axis representing the width of the regulating projection 20. It is to be noted that the pedestal 2 may be of one-piece construction including the projections 20, 22 and 24 and this can readily be accomplished by the use of any known plastic molding technique.

The coiled spring 8 has upper and lower ends as viewed in FIG. 4 and is mounted around the cylindrical projection 24. The lower end of the coiled spring 8 is bent at 8a to extend axially and is, when the coiled spring 8 is mounted around the cylindrical projection 24, inserted into a round hole 20c that is defined adjacent one 20a of the right-angled corners of the regulating projection 20.

Figure 5:
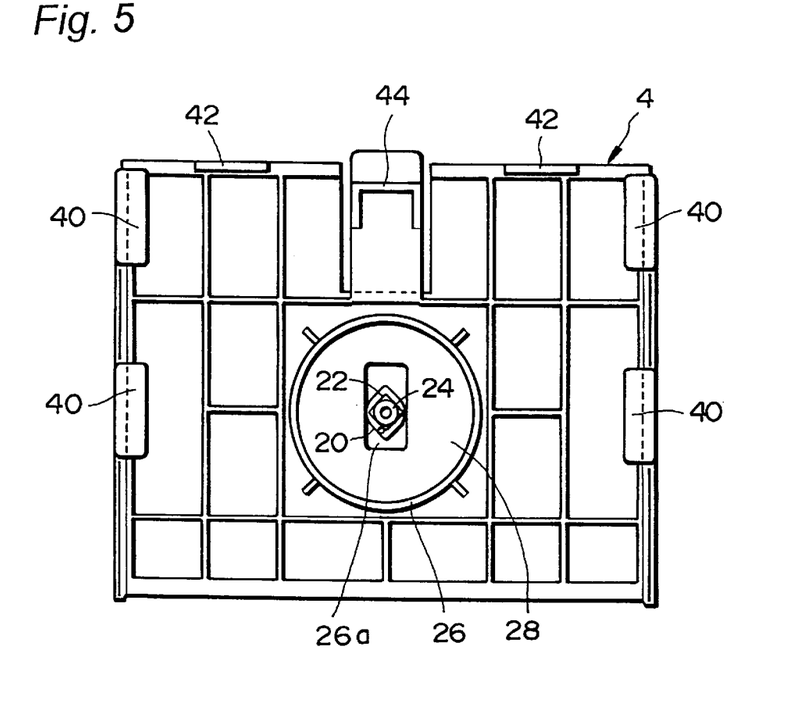
FIG. 5 is a top plan view showing a relation between that portion of the pedestal and a mounting plate employed in the rotary stand.

As best shown in FIGS. 3 and 5, the mounting plate 4 is mounted on the pedestal 2 for rotation and tilting relative to the pedestal 2 and has a semispherical bearing portion 26 formed integrally therewith. This bearing portion 26 has its undersurface defining a spherically convex portion generally complementary in shape to the spherically concave portion 18 in the pedestal 2 so that the mounting plate 4 can rotate and tilt relative to the pedestal 2 with such spherically convex portion held in sliding contact with the spherical concave portion 18. The bearing portion 26 also has its upper surface defining a spherically concave portion 28 corresponding to the spherically convex portion at the undersurface of the bearing portion 26. It is to be noted that the spherically convex portion of the bearing portion 26 that will be received within the spherically concave portion 18 in the pedestal 2 has a radius of curvature selected to be smaller than that of the spherically concave portion 18 in the pedestal 2. The spherical bearing portion 26 has a geometrically center portion formed with a rectangular slot 26a of a width equal to or substantially equal to the width of the regulating projection 20.

Figure 6:
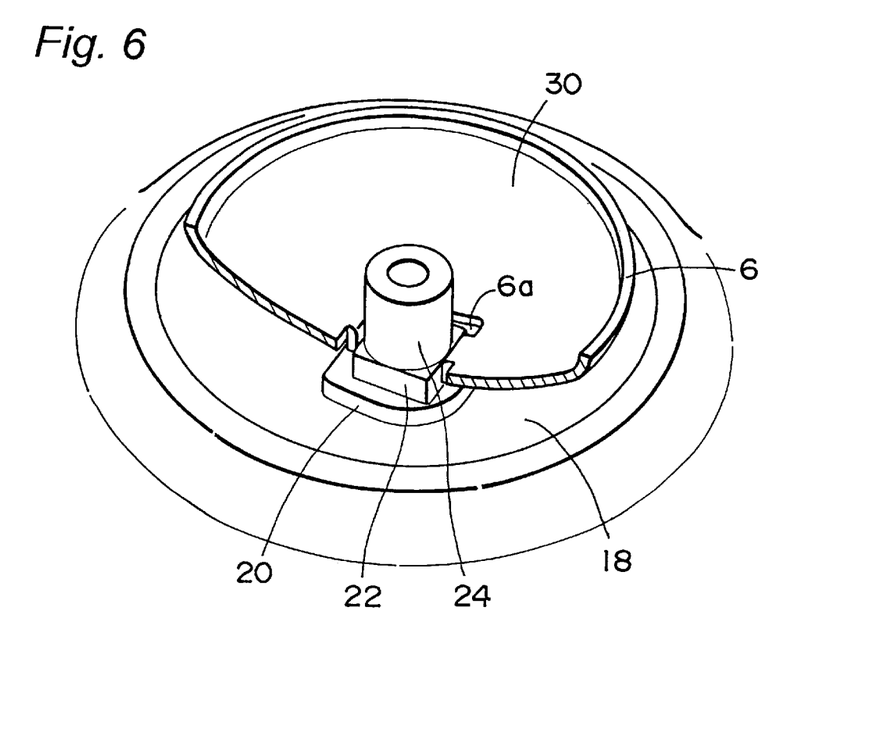
FIG. 6 is a perspective view, with a portion cut out, showing a relation between that portion of the pedestal and a clamp plate employed in the rotary stand.
Figure 7:
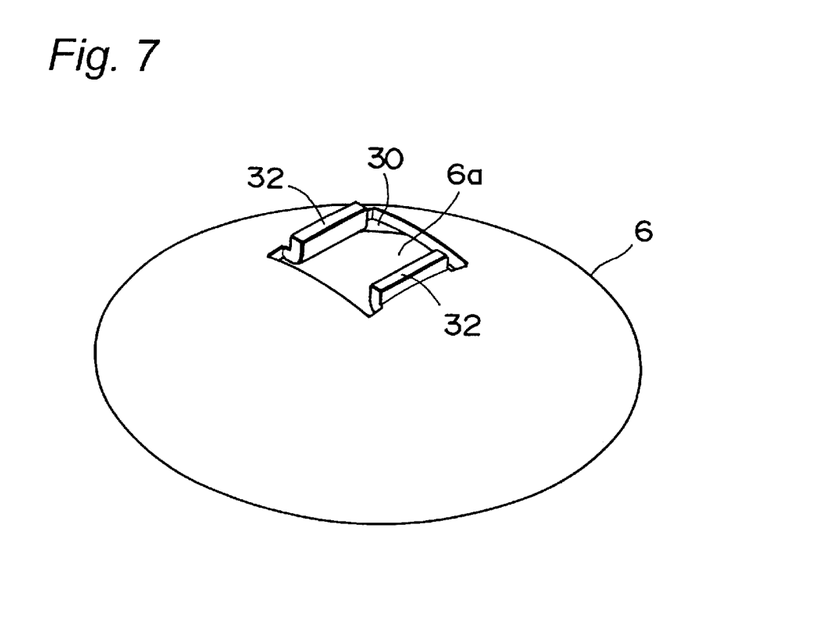
FIG. 7 is a perspective plan view of the clamp plate shown in FIG. 6 as viewed from below.

Referring to FIGS. 6 and 7, in a manner similar to the bearing portion 26 integral with the mounting plate 4, the clamp plate 6 is formed with a spherically concave portion 30 having its undersurface defining a spherically convex portion that is slidably engageable with the spherically concave portion 28 of the bearing portion 26 in the mounting plate 4. This clamp plate 6 has a geometrically center portion formed with a generally rectangular opening 6a. As best shown in FIG. 7, opposite two of the four side lip regions of the opening 6a are bent to protrude downwardly as viewed in FIG. 3 to thereby define engagements 32. These engagements 32 have an internal span so selected as to be approximately equal to the width (or the length) of the rectangular projection 22 integral with the pedestal 2 so that the engagements 32 can embrace the rectangular projection 22 to thereby allow the clamp plate 6 to cooperate with the pedestal 2 to clamp the bearing portion 26 of the mounting plate 4 therebetween. Thus, it will readily be seen that the mounting plate 4 is movably clamped between the clamp plate 6 and the pedestal 2 with the spherically concave portion 28 slidingly received within the spherically concave portion 18 and with the clamp plate 6 slidingly received within the spherically concave portion 28.

Considering that the bearing portion 26 of the mounting plate 4 does, while sandwiched between the pedestal 2 and the clamp plate 6, undergo rotary and tilting motions relative to the pedestal 2, the downwardly protruding wall of the bearing portion 26 has a wall thickness so selected that the engagements 32 formed on the undersurface of the clamp plate 6 will not collide with an upper surface of the regulating projection 20 integral with the pedestal 2.

Figure 8:
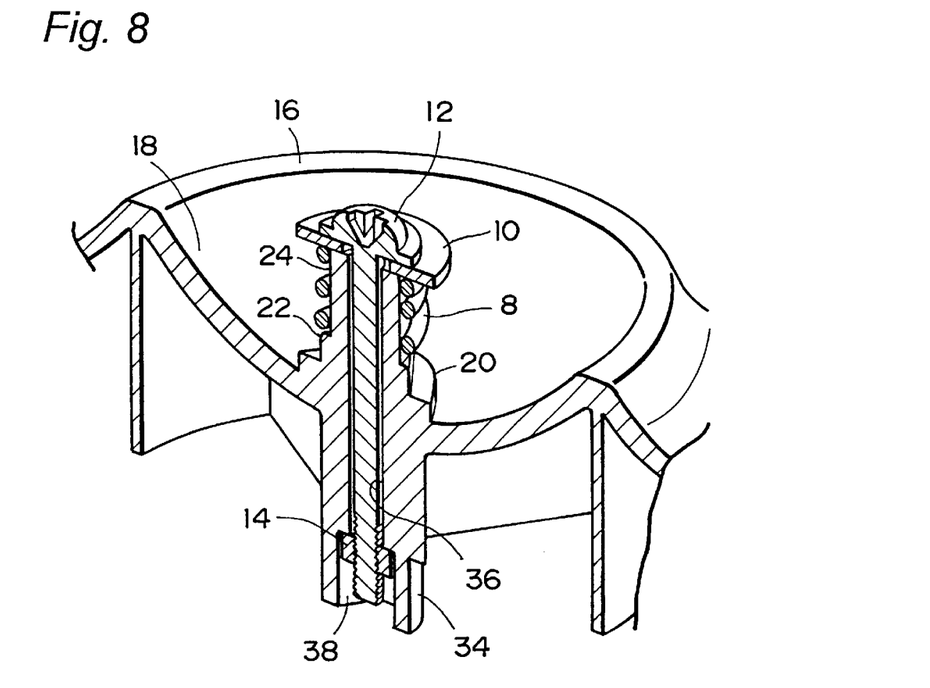
FIG. 8 is a perspective view, with a portion cut out, showing a relation between that portion of the pedestal and other component parts

As shown in FIG. 8, the clamp plate 6 has an upper surface held in engagement with the lowermost turn of the coiled spring 8 adjacent the axially extending end thereof that is inserted into the hole 20c in the regulating plate 20. An upper end of the coiled spring 8 opposite to the axially extending lower end thereof is held in engagement with the washer 10 held in position by the head of the screw 12. Accordingly, the clamp plate 6 is always urged downwardly towards the bearing portion 26 of the mounting plate 4 by a biasing force of the coiled spring 8.

Figure 9:
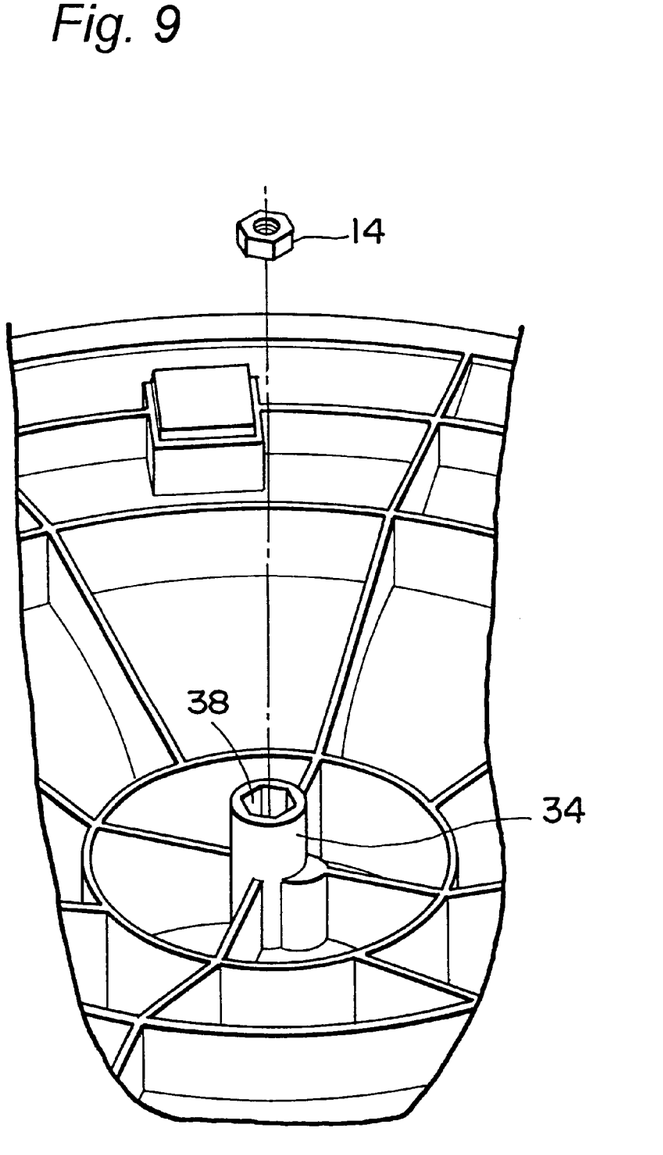
FIG. 9 is a perspective view of a portion of the pedestal as viewed from below.

As best shown in FIG. 9, an undersurface of the pedestal 2 is formed with a hollow cylindrical boss 34 that protrudes downwardly in alignment with the cylindrical projection 24 protruding upwardly as shown in FIG. 3. Respective hollows in the cylindrical projection 24 and the cylindrical boss 34 altogether define a screw hole 36 through which the screw 12 referred to hereinbefore extends. A lower end of the cylindrical boss 34 has a hexagonal recess 38 defined therein in alignment with the screw hole 36 for accommodating the nut 14 that is fastened to a lower end of the screw 12. Thus, the clamp plate 6, the mounting plate 4 and the pedestal 2 are united together by the screw 12 with the nut 14 fastened thereto.

In the rotary stand S of the above described structure, the bearing portion 26 of the mounting plate 4 is sandwiched between the spherically concave portion 18 of the pedestal 2 and the clamp plate 6 and is normally urged by the spring 8 towards the pedestal 2 through the clamp plate 6.

Referring particularly to FIG. 5 showing the mounting plate 4 as viewed from top, the mounting plate 4 has a plurality of retainers 40 for retaining the personal MD system M in position on the mounting plate 4, a plurality of stoppers 42 engageable with a rear portion of the body of the system M and a lock 44 for locking the body of the system M then retained on the mounting plate 4. The personal MD system M can be detachably mounted on the mounting plate 4 and can be locked in a retained position once it has been mounted on the mounting plate 4.

The rectangular slot 26a defined in the mounting plate 4 has its length lying in a direction forwardly and rearwardly and, with the mounting plate 4 so clamped between the clamp plate 6 and the pedestal 2, the regulating projection 20 integral with the pedestal 2 is accommodated within the rectangular slot 26a with its major axis lying parallel to the lengthwise direction of the rectangular slot 26a when the personal MD system M mounted on the mounting plate 4 is held at the neutral position. Thus, the opposite rounded side edges of the regulating projection 20 are held in face to face relation with associated long side edges of the rectangular slot 26a. However, when the personal MD system M on the mounting plate 4 is swung 45° either leftwards or rightwards, as shown in FIG. 2B, from the neutral position about the screw 12, the right-angled corners of the regulating projection 20 are brought into abutment with the associated long side edges of the rectangular slot 26a. Similarly, when the personal MD system M on the mounting plate 4 is tilted either 15° upwardly or 5° downwardly as shown in FIG. 2A from the neutral position, one of the opposite right-angled corners of the regulating projection 20 is brought into engagement with one of opposite short side edges of the rectangular slot 26a.

More specifically, when the personal MD system M mounted on the rotary stand S of the present invention is desired to be swung leftwards or rightwards, an user has to apply a pushing force to the personal MD system M to turn the latter leftwards or rightwards about the screw 12 together with the mounting plate 4 on which the personal MD system M rests. At this time, as the mounting plate 4 is so turned, the bearing portion 26 integrally formed therewith slidingly rotates while sandwiched between the spherically depressed wall 18 of the pedestal 2 and the clamp plate 6. Turn of the personal MD system M either leftwards or rightwards from the neutral position continues so long as the user applies the appropriate pushing force to the personal MD system M and the latter can be held standstill once application of the pushing force is interrupted.

As hereinabove described, the angle of tilt of the personal MD system M can be delimited by engagement of one of the right-angled corners of the regulating projection 20 with one of the short side edges of the rectangular slot 26a defined in the bearing portion 26 of the mounting plate 4.

Figure 10:
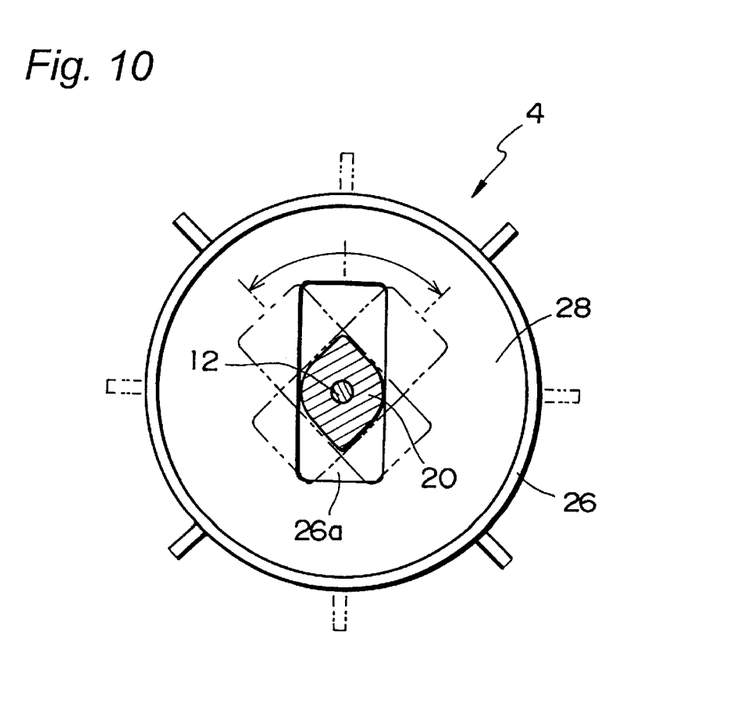
FIG. 10 is a top plan view of that portion of the pedestal shown in relation to the mounting plate, showing how the swing of the MD system is regulated.

On the other hand, the angle of swing of the personal MD system M about the screw 12 can be delimited by engagement of the right-angled corners of the regulating projection 20 with the respective long side edge of the rectangular slot 26a as shown by the phantom lines in FIG. 10. This is possible because the rectangular slot 26a has a width approximately equal to the width of the regulating projection 20, but smaller than the length of the regulating projection 20 as clearly shown in FIG. 10.

It is to be noted that although the rectangular slot 26a has been defined in the mounting plate 4, each of the opposite short side edges of the rectangular slot 26a may not be always straight, but may be outwardly curved. In other words, a generally oval slot may be employed in place of the rectangular slot 26a, provided that such slot has a pair of straight side edges.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A rotary stand for support thereon of a display unit or an audio equipment, said rotary stand comprising:

a pedestal having a spherically concave portion and a regulating projection integrally formed with the pedestal in the spherically concave portion, said regulating projection having a generally rhombic shape;

a mounting plate having a bearing portion and adapted to support thereon the display unit or the audio equipment; and a clamp plate for clamping the mounting plate between it and the pedestal while allowing the mounting plate to undergo a swinging motion leftwardly and rightwardly and also a tilting motion up and down;

said bearing portion of the mounting plate having a slot defined therein, an angle of any one of swing and tilt of the mounting plate being regulated by causing side edges of the regulating projection to engage corresponding inner side edges of the slot upon movement of the mounting plate.

2. The rotary stand as claim in claim 1, wherein the slot has a pair of parallel long side edges and wherein when the side edges of the regulating projection are brought into engagement with the long side edges of the slot, the angle of swing in a leftward or rightward direction is limited, whereas when the side edges of the regulating projection are brought into engagement with inner edges of the slot other than the long side edges, the angle of tilt in an upward or downward direction is limited.

3. The rotary stand of claim 1, wherein said side edges of the regulating said side edges of the regulating projection provide limits on rotation of the mounting plate about the regulating portion.

4. A rotary stand for support thereon of a display unit or an audio equipment, said rotary stand comprising:

a pedestal having a spherically concave portion and a regulating projection formed in the spherically concave portion;

a mounting plate having a bearing portion and adapted to support thereon the display unit or the audio equipment; and a clamp plate clamping the mounting plate between it and the pedestal while allowing the mounting plate to undergo a swinging motion leftwardly and rightwardly and also a tilting motion up and down;

said bearing portion of the mounting plate having a slot defined therein, an angle of any one of swing and tilt of the mounting plate being regulated by causing side edges of the regulating projection to engage corresponding inner side edges of the slot, wherein the slot has a pair of parallel long side edges and wherein when the side edges of the regulating projection are brought into engagement with the long side edges of the slot, the angle of swing in a leftward or rightward direction is limited, whereas when the side edges of the regulating projection are brought into engagement with inner edges of the slot other than the long side edges, the angle of tilt in an upward or downward direction is limited; and wherein the regulating projection has approximately right-angled corners one on each end of a major axis thereof and also has side edges one on each end of a minor axis thereof, each of said side edges being curved to represent a generally arcuated shape, said regulating projection having a width as measured in a direction along the minor axis thereof that is approximately equal to a width of the slot as defined between the long side edges of the slot.

5. A rotary stand for support thereon of a display unit or an audio equipment, said rotary stand comprising:

a pedestal having a spherically concave portion and a regulating projection formed in the spherically concave portion;

a mounting plate having a bearing portion and adapted to support thereon the display unit or the audio equipment; and a clamp plate for clamping the mounting plate between it and the pedestal while allowing the mounting plate to undergo a swinging motion leftwardly and rightwardly and also a tilting motion up and down;

said bearing portion of the mounting plate having a slot defined therein, an angle of any one of swing and tilt of the mounting plate being regulated by causing side edges of the regulating projection to engage corresponding inner side edges of the slot, wherein the spherically concave portion of the pedestal is formed with a rectangular projection and the clamp plate is formed with a generally rectangular opening defined therein, opposite inner edge portions of the clamp plate that define opposite sides of the opening being bent downwardly to engage the rectangular projection to thereby allow the clamp plate to be retained relative to the pedestal.

6. A rotary stand for support thereon of a display unit or an audio equipment, said rotary stand comprising:

a pedestal having a spherically concave portion and a regulating projection formed in the spherically concave portion;

a mounting plate having a bearing portion and adapted to support thereon the display unit or the audio equipment; and a clamp plate for clamping the mounting plate between it and the pedestal while allowing the mounting plate to undergo a swinging motion leftwardly and rightwardly and also a tilting motion up and down;

said bearing portion of the mounting plate having a slot defined therein, an angle of any one of swing and tilt of the mounting plate being regulated by causing side edges of the regulating projection to engage corresponding inner side edges of the slot, further comprising a biasing spring for biasing the clamp plate towards the bearing portion of the mounting plate, said biasing spring having a lower end fixed to the pedestal.

7. The rotary stand as claimed in 6, wherein the regulating projection and the rectangular projection have a common hole defined therein, and further comprising a screw and a nut, said screw extending through the common hole and fastened with the nut to thereby connect the mounting plate, the clamp plate and the biasing spring together with the pedestal.

* * * * *